United States Patent
Tietke et al.

(10) Patent No.: US 9,041,517 B2
(45) Date of Patent: May 26, 2015

(54) RFID READING DEVICE, RFID SYSTEM, METHOD FOR CONTROLLING THE TRANSMITTING POWER OF AN RFID READING DEVICE, AND COMPUTER PROGRAM PRODUCT

(75) Inventors: Markus Tietke, Berlin (DE); Frank Fritze, Berlin (DE); Manfred Paeschke, Wandlitz (DE); Jorg Fischer, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 518 days.

(21) Appl. No.: 13/498,526

(22) PCT Filed: Sep. 13, 2010

(86) PCT No.: PCT/EP2010/063373
§ 371 (c)(1),
(2), (4) Date: Mar. 5, 2013

(87) PCT Pub. No.: WO2011/039047
PCT Pub. Date: Apr. 7, 2011

(65) Prior Publication Data
US 2013/0222119 A1   Aug. 29, 2013

(30) Foreign Application Priority Data
Sep. 30, 2009   (DE) .......... 10 2009 045 186

(51) Int. Cl.
G08B 13/14   (2006.01)
G06K 19/07   (2006.01)
G06K 7/00    (2006.01)
G06K 7/10    (2006.01)

(52) U.S. Cl.
CPC ........ *G06K 19/0701* (2013.01); *G06K 7/10237* (2013.01); *G06K 7/0008* (2013.01); *G06K 7/10128* (2013.01)

(58) Field of Classification Search
CPC ........................... H04B 5/0075; H04B 5/0081
USPC ........ 340/539.1, 539.11, 572.1, 572.3, 572.4, 340/572.7, 568.7, 10.1, 10.3; 235/379, 380, 235/381; 432/372; 455/522
See application file for complete search history.

(56) References Cited

U.S. PATENT DOCUMENTS

| | | | |
|---|---|---|---|
| 4,899,036 A | | 2/1990 | McCrindle et al. |
| 7,197,279 B2 * | | 3/2007 | Bellantoni .................. 455/41.2 |
| 7,239,858 B2 * | | 7/2007 | Bellantoni ................ 455/277.1 |
| 7,597,250 B2 * | | 10/2009 | Finn .............................. 235/380 |
| 7,845,568 B2 * | | 12/2010 | Parlange et al. ............. 235/492 |
| 8,102,243 B2 * | | 1/2012 | Horne et al. ................. 340/10.1 |
| 8,249,500 B2 * | | 8/2012 | Wilson ......................... 455/41.1 |
| 8,305,193 B2 * | | 11/2012 | Horne et al. ................. 340/10.1 |
| 8,542,834 B1 * | | 9/2013 | Feikis et al. ................. 380/270 |

FOREIGN PATENT DOCUMENTS

EP   1988487 A1   11/2008
WO   2005059808 A1   6/2005

\* cited by examiner

*Primary Examiner* — Van Trieu
(74) *Attorney, Agent, or Firm* — Leveque IP Law, P.C.

(57) ABSTRACT

The invention relates to an RFID reading devices having: transmitting means for generating a field for inductively coupling to an RFID transponder; measuring means for measuring a field strength of the field; and control means for controlling the transmitting power on the basis of the measured field strength.

27 Claims, 7 Drawing Sheets

Figure 1:
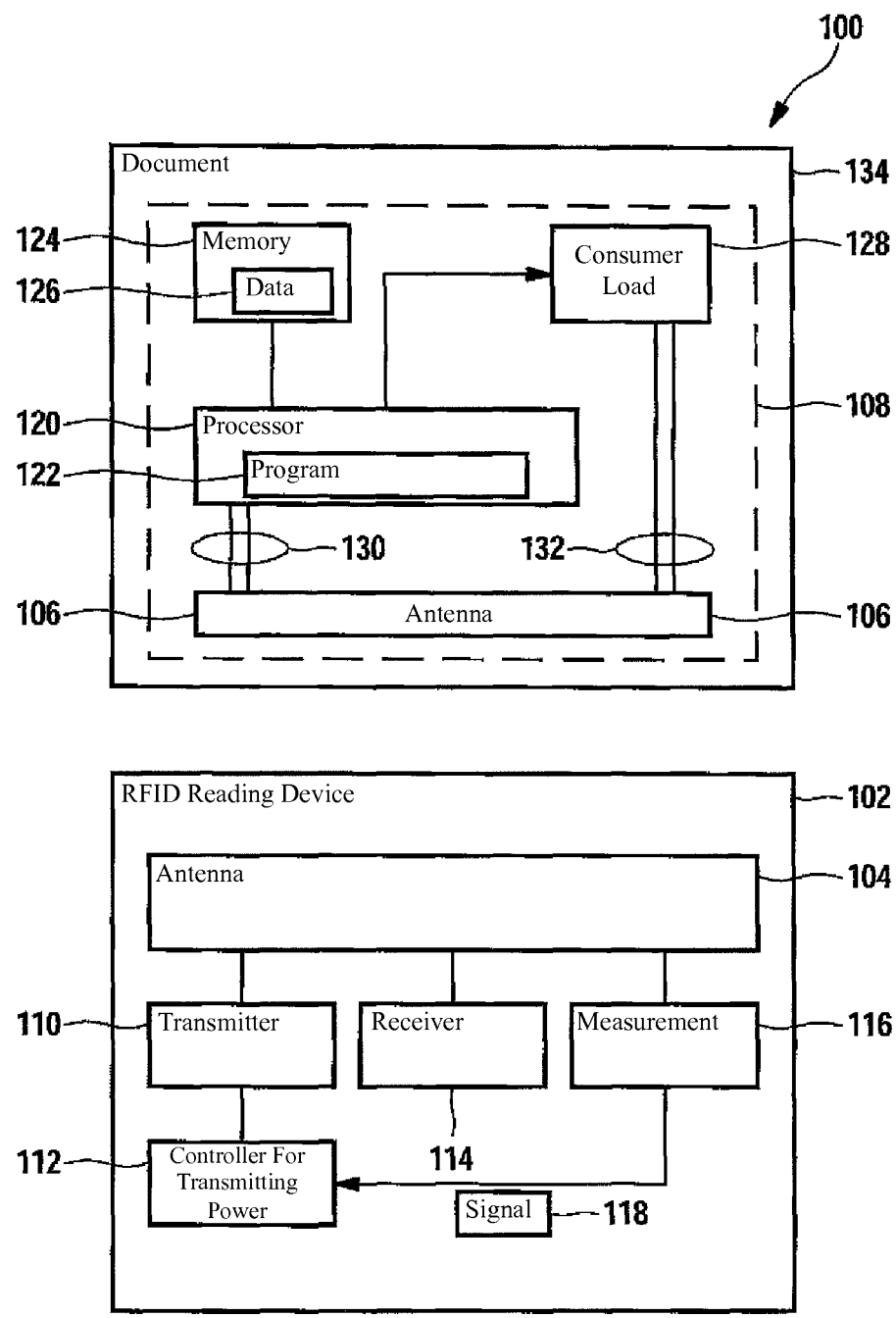

RFID READING DEVICE, RFID SYSTEM, METHOD FOR CONTROLLING THE TRANSMITTING POWER OF AN RFID READING DEVICE, AND COMPUTER PROGRAM PRODUCT

The invention relates to an RFID reading device, an RFID system with an RFID reading device and a document, a method for controlling the transmitting power of an RFID reading device, and a computer program product.

Various radio identification systems, which are also called Radio Frequency Identification (RFID) systems, are known from the state of the art. RFID systems in which communication takes place by means of inductive coupling between an RFID reading device and an RFID transponder are known from the state of the art. Also known is that the RFID token can be a passive RFID transponder without its own energy source, whereby a passive RFID transponder obtains the electrical energy necessary for its operation from the field generated by the RFID reading device through inductive coupling.

RFID systems that are already known generally contain at least one transponder and one RFID reading device, that is, a sending/receiving unit. The transponder is also known as an RFID marker, RFID chip, RFID tag, RFID label, or radio marker; the sending/receiving unit is also known as a reading device or reader.

The data stored in an RFID transponder can be made available by means of the alternating magnetic field. At low frequencies this occurs inductively via a near field.

An RFID transponder typically contains a microchip and an antenna, which are situated in a carrier or housing or printed on a substrate. In contrast to passive RFID transponders, active RFID transponders also have an energy source such as a battery, for example.

RFID transponders can be used for various documents, especially chip cards, for example for implementation of an electronic purse or for electronic ticketing, or they are integrated in paper, such as value documents and security documents, particularly bank notes and identification documents.

For example, an identification and security card, made of laminated and/or spray-coated plastic, and containing an integrated semiconductor with an antenna for carrying out an RFID process, is known from DE 201 00 158 U1. Further, a book-type document such as a passport, which contains a transponder unit, is known from DE 10 2004 008 841 A1.

Such security and value documents are implemented as chip cards to some extent in the state of the art. These can be equipped with an RFID interface. Appropriate chip card communication protocols and methods are established in ISO 14443, for example.

The invention solves the problem of creating a better RFID reading device, an RFID system, a method for controlling the transmitting power of an RFID reading device, and a corresponding computer program product.

The problems the invention addresses are each solved with the features of the independent patent claims. Embodiments of the invention are specified in the dependent patent claims.

According to embodiments of the invention, an RFID reading device is created with transmitting means for generating a field for inductively coupling to an RFID transponder. The RFID reading device contains measuring means for measuring a field strength of the field, and control means for controlling the transmitting power on the basis of the measured field strength.

Embodiments of the invention are particularly advantageous in that the power consumption of the RFID reading device can be reduced. Contrary to what is typical in the state of the art, the RFID reading device is not operated with constant transmitting power, but rather, the transmitting power is controlled on the basis of the measured field strength. Because the measured field strength depends on the presence or absence of the RFID transponder, and if applicable, on its current secondary side load, the transmitting power can be adjusted to the actual power requirement of the RFID transponder and thereby on average be reduced.

According to one embodiment of the invention, the control means are constructed such that the transmitting means are operated with a first transmitting power level such that without a secondary side load a first field strength results, whereby the measured field strength is compared with a first threshold value, and the transmitting means is operated with a second transmitting power level if the first threshold value is not reached, whereby the second transmitting power level is greater than the first transmitting power level.

Embodiments of the invention are particularly advantageous because the power consumption of the RFID reading device can be further reduced. As long as there is no RFID transponder within the range of the transmitting means, the RFID reading device is operated with the first transmitting power level. The introduction of an RFID transponder into the range of the transmitting means is detected by the RFID reading device through a reduction of the resulting field strength, in that the measured field strength is compared with the first threshold value.

The RFID transponder namely constitutes a load for the transmitting means, due to the inductive coupling, which leads to a reduction of the measured field strength when the first transmitting power level is constant. The transmitting power is then scaled up to the second transmitting power level in order to supply the RFID transponder with sufficient power.

It is particularly advantageous here that the RFID reading device can be operated with a minimal transmitting power level as long as there is no RFID transponder within range of the transmitting means, and that only when an RFID transponder is in fact within range of the transmitting means must the transmitting power be increased to the second transmitting power level.

This is particularly advantageous when the RFID reading device is a battery-operated reader, as the battery life can thus be significantly prolonged. In particular, the RFID reading device can be integrated into a portable electronic device, such as a mobile telephone, especially a smart phone, a personal digital assistant (PDA), or a portable computer, particularly a laptop computer.

According to one embodiment of the invention, the RFID reading device can also be designed for connection to such a portable electronic device, in order to be supplied with energy from the battery of said portable electronic device. The battery of the RFID reading device or portable electronic device can be a primary cell or a secondary cell.

According to one embodiment of the invention, the first field strength is equal to or greater than an activation field strength of the RFID transponder.

The term "activation field strength" is understood here to mean, for example, the field strength at which a power sufficient to build up oscillation of the oscillator of the RFID transponder is coupled into the RFID transponder. The activation field strength is, on the other hand, too low to allow reliable data communication between the RFID reading device and the RFID transponder, that is, the RFID transponder either fails to respond or responds incorrectly to a request of the RFID reading device sent with the activation field strength. The activation field strength is therefore less than an operating field strength of the RFID transponder.

The term "operating field strength" of the RFID transponder is understood here to mean a field strength that suffices to develop data communication between the RFID reading device and the RFID transponder. Thus the RFID token responds correctly to a request sent by the RFID reading device with the operating field strength.

The term "transmitting power" of the RFID reading device is understood here to mean the power consumption of the transmitting means. The first transmitting power level can be, for example, between 10 mW and 50 mW. The first field strength can be less than 1.5 A/m, specifically 0.5-1 A/m. In contrast, the second transmitting power level can be, for example, between 90 mW and 110 mW, particularly 100 mW, or between 190 mW and 210 mW, particularly 200 mW. The second field strength can be more than 1.5 A/m, particularly up to 2.5 A/m, for example 2 A/m.

According to one embodiment of the invention, the control means are constructed such that after the transmitting power has increased to the second transmitting power level, the field strength then measured is compared with a second threshold value. If the measured field strength sinks below the second threshold value, this means that the secondary side load has increased, for example because one or more additional consumer loads of the RFID transponder or document have been connected, or the power consumption of a consumer load has increased. In order to raise the coupled-in power, the transmitting power is then increased to a third transmitting power level, for example, over 600 mW. The resulting third field strength can then be above 6 A/m.

According to one embodiment of the invention, after increasing the transmitting power to the third transmitting power level, the field strength then measured is compared with a third threshold value. If the measured field strength exceeds the third threshold value, the transmitting power is reduced to the first transmitting power level.

Exceedance of the third threshold value results namely from the RFID transponder being taken out of range of the transmitting means, such that the secondary side load falls away. This causes a corresponding increase in the measured field strength. Due to the thus detected removal of the RFID transponder from the RFID reading device, the RFID reading device goes back to its initial state, that is, it is operated with the first transmitting power level in order to detect the renewed introduction of an RFID transponder into the range of the transmitting means.

According to one embodiment of the invention, after the first threshold value is not reached, repeated requests are sent by the RFID reading device to the RFID transponder. The transmitting power is thereby increased incrementally until a correct response to one of the requests is received from the RFID transponder by the RFID reading device. With the transmitting power thus adjusted, it is thus possible to establish data communication between the RFID reading device and the RFID transponder, that is, with the transmitting power thus adjusted, the RFID reading device is operated with the operating field strength of the RFID transponder. The term "request" is understood to mean a command, for example, according to a standardized RFID data communication method.

According to one embodiment of the invention, the transmitting power is readjusted if the RFID transponder gives one or more incorrect responses during data communication between the RFID reading device and the RFID transponder. In this case, the transmitting power is increased incrementally until a correct response of the RFID transponder is received upon request of the RFID reading device. Such an adjustment of the transmitting power can be necessary particularly when one or more consumer loads of the RFID transponder or the document are connected during data communication.

According to one embodiment of the invention, during data communication between the RFID reading device and the RFID transponder, the transmitting power is tentatively reduced because the secondary side load could have been reduced in the meantime, in particular through one or more consumer loads being disconnected or having reduced power consumption. For example, the transmitting power is successively reduced until a request from the RFID reading device to the RFID transponder receives an incorrect response. When this occurs, the transmitting power is increased again, for example by one increment, until a request from the RFID reading device returns a correct response from the RFID transponder. The tentative reduction of the transmitting power can thereby be undertaken repeatedly according to specified time intervals of, e.g., seconds or minutes, or after a certain number of requests, each of which has received a correct response, have been sent from the RFID reading device.

According to one embodiment of the invention, the transmitting power is increased stepwise in specified transmitting power increments, after the measured field strength has fallen below the first threshold value. The increase in transmitting power by one transmitting power increment leads thereby to a corresponding field strength increment, which is measured by the RFID reading device. If the field strength increment is equal to or greater than one increment threshold, the transmitting power is increased again, until a field strength increment is smaller than the increment threshold.

When the field strength increment is namely smaller than the increment threshold, this means that the secondary side load, which the RFID transponder constitutes for the RFID reading device, has risen dramatically. Such a strong increase in the secondary side load can be caused by the fact that the voltage coupled into the RFID tag has become so high due to the incremental increase in the transmitting power that an overvoltage protector of the RFID transponder is activated, which leads to a strong increase in the load. The transmitting power is then reduced by at least one voltage increment, whereby a maximum electrical power is coupled into the RFID transponder at the transmitting power so adjusted. The field hereby generated can be measured by the RFID reading device, and the measured field strength can thereafter be used as the target quantity for the readjustment of the transmitting power.

In a further aspect, the invention relates to an RFID system with an embodiment of an RFID reading device according to the invention, and a document that contains the RFID transponder.

According to the invention, the term "document" is understood to mean paper-based and/or plastic-based documents, particularly value or security documents, such as, e.g., pieces of identification, particularly passports, identity cards, visas, as well as driver's licenses, vehicle registration certificates, vehicle titles, employee IDs, health insurance cards, or other ID documents such as chip cards, instruments of payment, in particular bank notes, bank cards and credit cards, bills of lading, or other credentials.

According to one embodiment of the invention, a passive RFID transponder is integrated into the document, that is, the document has no energy source of its own, in particular, no primary battery. This is especially advantageous for documents with a relatively long period of validity, because there is no need to change batteries. In particular, this is especially advantageous for official documents.

According to one embodiment of the invention, the document has at least one connectable consumer load such as, e.g., a display or a sensor.

The display can be an electrophoretic display, an electrochromic display, an electrowetting display, a bistable display, a rotating element display, an LCD display or an OLED display. The display device can be integrated into the body of the card and/or form a structural unit with the RFID transponder. The display device can also be connected with the RFID transponder by means of electrical circuits within the document body, in order to be supplied with electrical energy by the RFID transponder.

The electrical consumer load can be a sensor, such as for recording a biometric characteristic and/or provision of a manipulandum for implementing a user interface. For example, the sensor can be designed as a fingerprint sensor or as a camera for recording an iris scan or for facial biometrics.

The sensor can also be integrated as a separate component within the document body or can form a structural unit with the RFID transponder.

The integration of an RFID transponder, a display device and/or a sensor into a document is known from the state of the art: see for example WO 2009/062853, WO 2009/062869, WO 2009/062860, WO 2009/062870, WO 2009/062861, WO 2009/062827, WO 2009/062892, WO 2009/062893, WO 2009/062788, WO 2009/062810, WO 2009/062855, WO 2009/053249, WO 2009/062832.

Depending on the application, one or more consumer loads of the RFID transponder can be connected or disconnected, such that a corresponding temporally varying power requirement results, which needs to be coupled into the RFID transponder. Further, during operation, the power requirement of a consumer load can fluctuate; for example, the power requirement of an emissive display can depend on the picture currently being viewed.

Embodiments of the invention are particularly advantageous because the power coupled into the RFID transponder depends on the current power requirement of the RFID transponder; therefore only so much power is coupled into the RFID transponder as is actually needed. If for example only the processor of the RFID transponder is to be operated, less energy is coupled in than if the consumer load actually must be supplied with energy as well. This can prevent a costly power management process and the discharge of large power losses from the document.

In a further aspect, the invention relates to a method for controlling the transmitting power of an RFID reading device with the following steps: operation of the RFID reading device with a first transmitting power level such that a first field strength is set, as long as the RFID transponder is not located within the range of the transmitting means; measurement of the field strength for detecting the introduction of the RFID transponder into the range of the transmitting means, whereby due to the introduction of the RFID transponder into the range of the transmitting means, the measured field strength falls below a first threshold value; and operation of the RFID reading device with a second transmitting power level if the measured field strength is below the first threshold value, whereby the second transmitting power level is greater than the first one.

In a further aspect, the invention relates to a computer program product, in particular a digital storage medium with executable program instructions for carrying out an embodiment of the method according to the invention.

Figure 2:
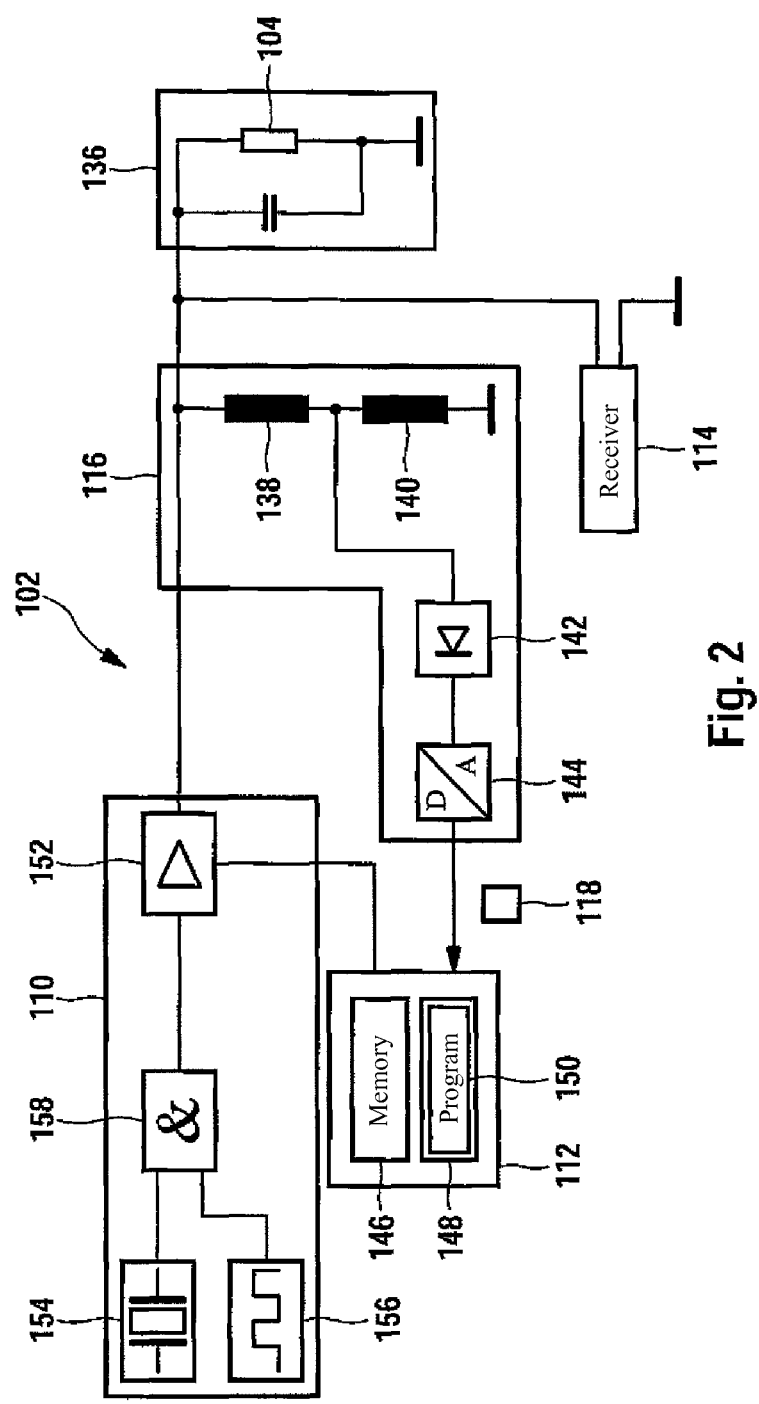
Figure 3:
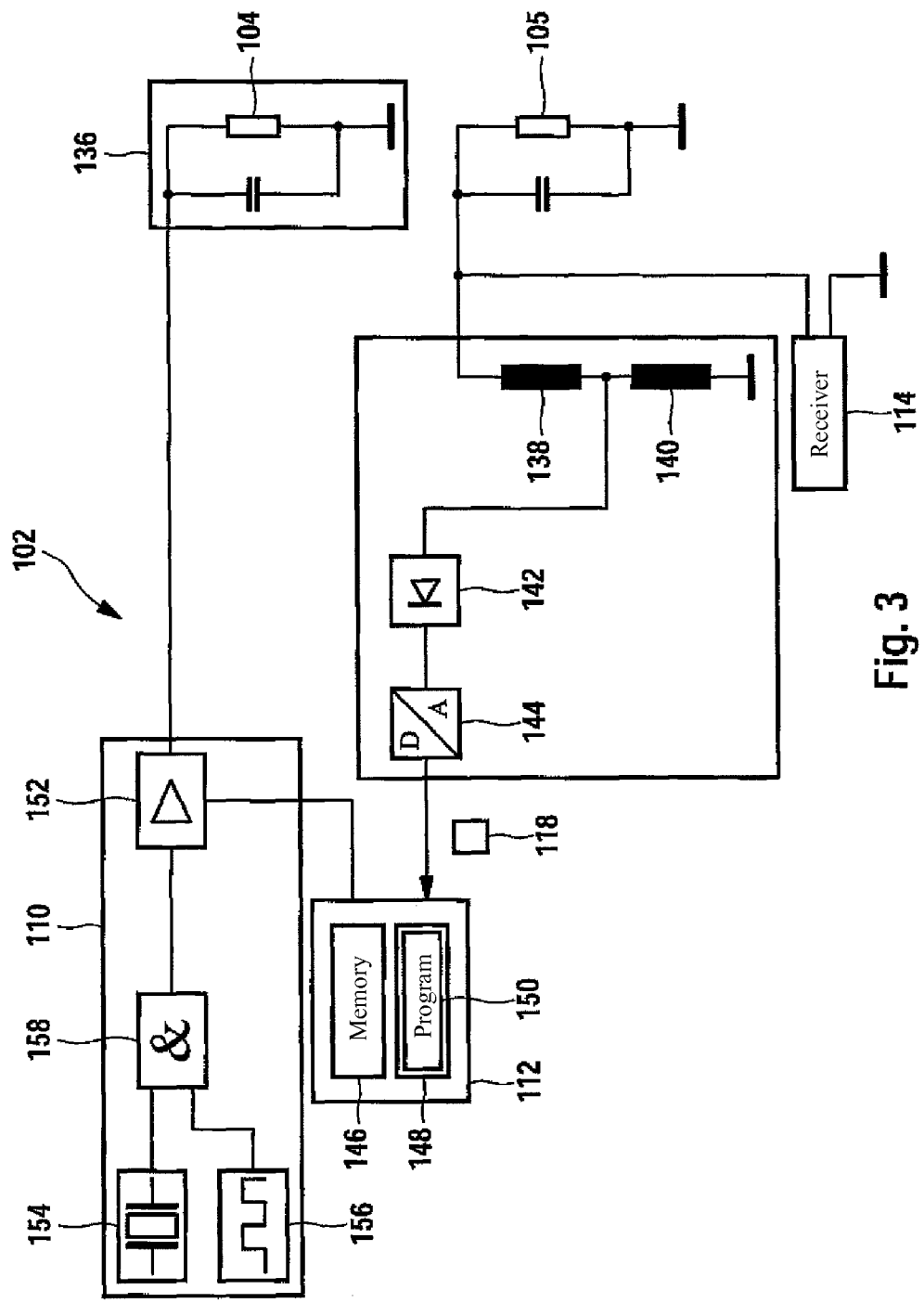
Figure 4:
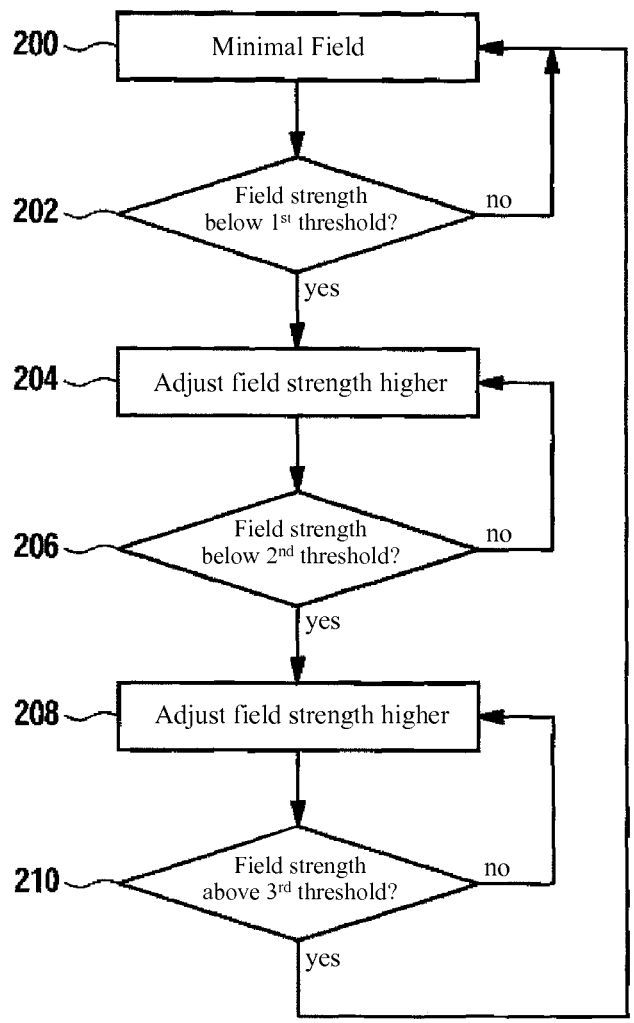
Figure 5:
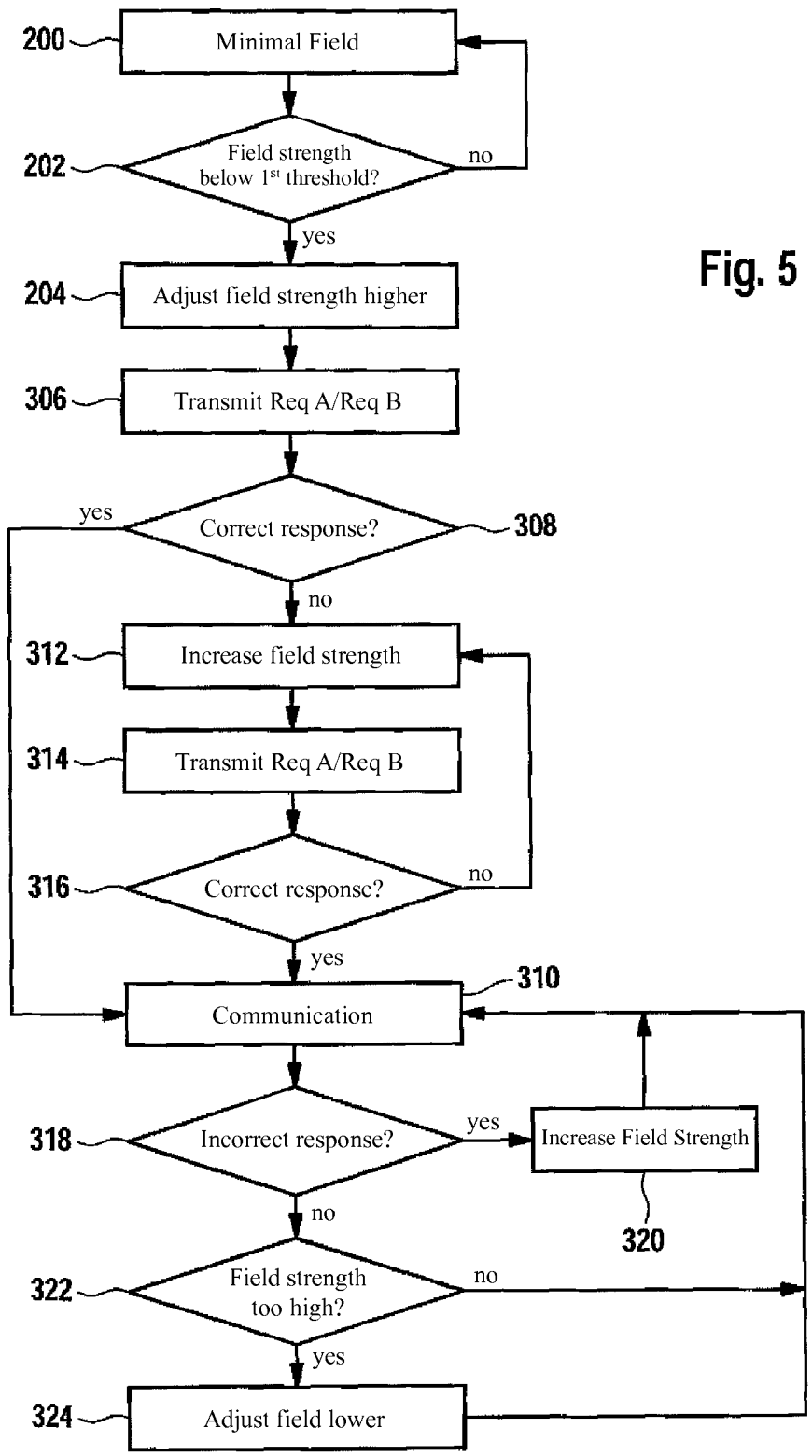
Figure 6:
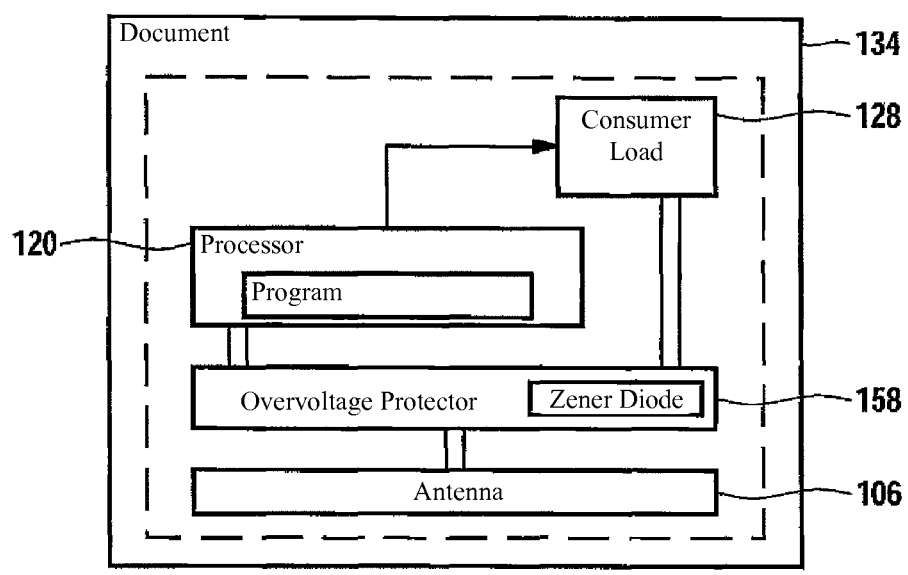
Figure 7:
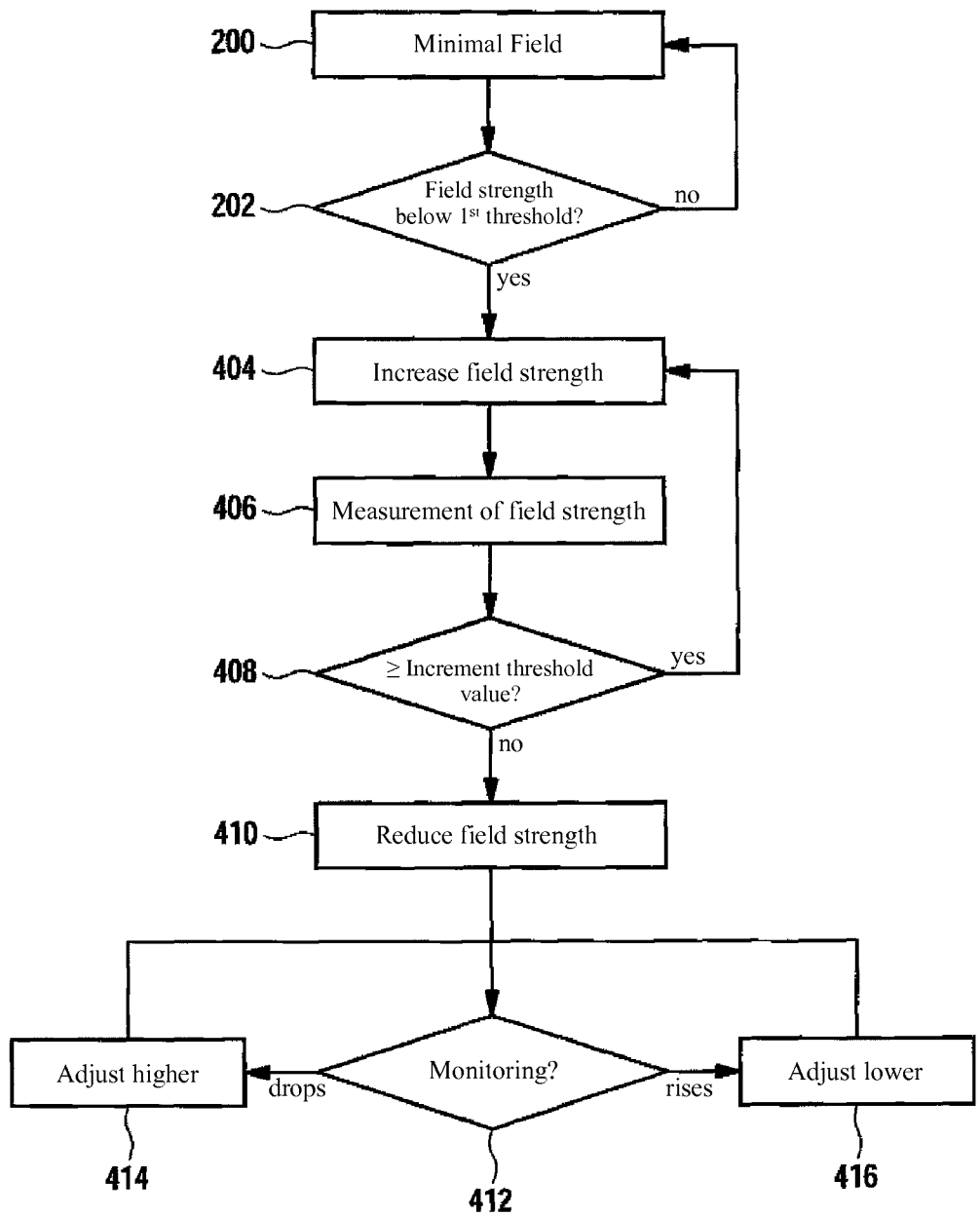

In the following text, embodiments of the invention will be described in more detail, with reference to the drawings as follows:

FIG. 1 a block diagram of an embodiment of an RFID system according to the invention FIG. 2 a circuit diagram of an embodiment of an RFID reading device according to the invention FIG. 3 a circuit diagram of a further embodiment of an RFID reading device according to the invention, FIG. 4 a flow chart of an embodiment of a method according to the invention, FIG. 5 a flow chart of an embodiment of a method according to the invention, FIG. 6 a block diagram of an embodiment of a document with integrated ID token, FIG. 7 a flow chart of an embodiment of a method according to the invention.

In the following, elements that correspond to one another will each be designated with the same reference numeral.

FIG. 1 shows an RFID system 100. To this RFID system 100 belong an RFID reading device 102 and a document 134 with an integrated RFID transponder 108. The RFID reading device 102 has at least one antenna 104 for inductive coupling with an antenna 106 of an RFID transponder 108.

The RFID reading device 102 has, further, a transmitter 110 that is coupled with the antenna 104, as well as a controller 112 for controlling the transmitting power of the transmitter 110. The antenna 104 is further connected with a receiver 114.

Furthermore, the RFID reading device 102 has a component 116 that is coupled with the antenna 104, in order to measure the field strength generated by the RFID reading device 102. The component 116 generates a signal 118 which is entered into the controller 112 as a measurement for implementing the control.

The RFID transponder 108 contains a processor 120 for executing program instructions 122 and a memory 124 for storing data 126. The memory 124 is a non-volatile memory. By executing program instructions 122, the processor 120 can access the data 126 in order to send said data to the RFID reading device 102. Basic Access Control and/or Extended Access Control, familiar from the state of the art (see for example DE 10 2005 025 806), can be provided to protect the data against unauthorized readouts.

The RFID transponder 108 has, further, at least one consumer load 128. This consumer load 128 can be a display device or a sensor, for example. The consumer load 128 has variable power consumption. For example, the consumer load 128 is able to be connected or disconnected, whereby the processor can generate appropriate switch signals by executing the program instructions 122.

The consumer load can be, for example, an OLED display integrated into the document 134. In this case the RFID reading device 102 can send a request to the RFID transponder 108 in order to request that a picture of the holder of the document 100, such as a passport photo, be displayed. Execution of program instructions 122 connects the consumer load 128, here the display, in order to activate it to render relevant picture data that can be stored in the memory 124. The power consumption of the display can thereby depend on the picture being rendered, in particular if the display is an emissive display.

The processor 120 is connected with the antenna 106 by means of circuits 130, and the consumer load 128 is connected with antenna 106 by means of circuits 132.

Antenna 106, processor 120, memory 124 and/or the consumer load 128 can be designed as discrete components, or designed as partially or completely integrated circuits.

Antennas 104 and 106 are designed for inductive coupling, whereby antenna 104 is for the primary side load and antenna 106 is for the secondary side load. The transmitter 110 is constructed such that a magnetic field with a carrier wave of, for example, 13.56 MHz, is generated by antenna 104. This carrier wave is inductively coupled into the antenna 106 such that at the antenna 106 there is a drop in voltage, which, via circuits 130 and/or 132, serves to supply voltage to the processor 120 and the consumer load 128, when this is connected.

The RFID transponder 108 is integrated into a document 134. The document 134 can be an electronic identification card or another electronic identification document. The RFID transponder 108 is integrated into the document body of the document 134. The document 134 can be constructed in layers, whereby the RFID transponder 108 forms one layer of the document 134.

The RFID reading device 102 is preferably a portable battery-operated device. The RFID reading device 102 can form an integral component of a portable battery-operated device with further functions such as a mobile telephone, a radio set for official use, or similar.

As long as document 134 is not located within the range of antenna 104 of the RFID reading device 102, that is, within a distance of more than 20-30 cm, the transmitter 110 is operated with a minimal first transmitting power level, which is specified by the controller 112. Due to this first transmitting power level, the antenna 104 generates a field with a first field strength in the range of the activation field strength of the RFID transponder 108. Furthermore, the field strength is continuously measured by component 116, and the corresponding field strength values are entered with the signals 118 into the controller 112.

The controller 112 is designed such that it compares the field strength measured by component 116 with a first threshold value. As soon as the controller receives a signal 118 in which a measurement reading that lies below this first threshold value is given for the field strength measured, the controller 112 increases the transmitting power of the transmitter 110 to a second transmitting power level.

This case occurs when the document 134 is brought into the range of the antenna 104, such that a sufficiently strong inductive coupling exists between antennas 104 and 106. The energy then generated by the RFID reading device 102 coupled into the RFID transponder suffices to build up oscillation in the processor 120 or an oscillator of the processor 120, which provides a clock signal. This causes the secondary side load to increase, such that the field strength falls below the first threshold value. This decrease in field strength is recorded by the component 116 and signaled to the controller 112, which then increases the transmitting power to the second transmitting power level, such that then the RFID reading device 102 generates a field with the required first operating field strength for correct functioning of the processor 120. After increasing the transmitting power to the second transmitting power level, the controller 112 checks whether the field strength measured by the component 116 falls below a second threshold value. Alternatively or additionally, this operating field strength is used as a target quantity for the control of the transmitting power, whereby the field strength is continuously measured.

The transmitter 110 can for example send a request to the RFID transponder 108 to read the data 126 from the memory 124. This request is received by the RFID transponder 108 through the antenna 106 and processed by executing the program instructions 122. Execution of program instructions 122 accesses data 126 in order to read these from the memory 124 and to send a response with the requested data to the RFID reading device 102. To this end, the execution of a basic access control and/or extended access control method can be required in order to protect the data 126 against unauthorized access. The response of the RFID transponder 108 is received by the receiver 114 of the RFID reading device 102 via the antenna 104.

For example, a requirement for reading the data 126 can be that a biometric authentication of the carrier of the document 134 takes place beforehand. In this case the consumer load 128 can be constructed as a fingerprint sensor in order to record the fingerprint of the carrier of the document 134. After receiving the request to read the data 126 from the RFID reading device 102, the consumer load is then connected through execution of program instructions 122, in order to enable biometric authentication of the carrier of the document 134, that is, to record his fingerprint.

Through connection of the consumer load 128 the secondary side load increases further, such that the field falls below the second threshold value. This is registered by the component 116 and signaled to the controller 112. The controller 112 thereupon increases the transmitting power to a third transmitting power level.

Due to the third transmitting power level, the RFID reading device 102 generates a field that is strong enough to couple the power required for operation of the consumer load 128 into the RFID token 108. This then allows the fingerprint data to be recorded by means of the consumer load 128.

With sufficient agreement between the fingerprint data and, for example, a reference value stored in a secure memory area of the memory 124, the biometric test is considered passed, so that the read access to the data 126 is carried out, whereby depending on the embodiment, the fulfillment of further conditions can be required for this.

Through increasing the transmitting power to the second transmitting power level, the field strength generated by the RFID reading device 102 increases to a second operating field strength, in which sufficient power is coupled into the RFID transponder 108 to operate the processor 120 as well as the connected consumer load 128. The controller then checks whether the field strength exceeds a third threshold value, whereby the third threshold value is greater than the second operating field strength.

If the document 134 is removed from the range of the RFID reading device 102, the secondary side load drops and the field strength rises correspondingly, so that the third threshold value is exceeded. The removal of document 134 from the RFID reading device is hereby detected.

The RFID reading device 102 then switches into its initial state, in that the controller 112 specifies the first transmitting power level for operation of the transmitter 110. In the embodiment considered here it is particularly advantageous that the RFID reading device 102 can be operated with minimal power consumption, as long as there is no document 134 within the range of the antenna 104. Only when the controller 112 detects a document 134 within the range of the antenna 104 due to a drop in the field strength, is the power consumption increased in order to generate a field with the first operating field strength.

A further optimization of the required power consumption of the RFID reading device is achieved thereby that a higher second transmitting power level is necessary for reaching the second operating field strength only after the connection of the consumer load 128 has been detected, due to the decrease in the measured field strength below the second threshold value. By setting the transmitting power level of the RFID reading device 102 according to whether the document 134 is within range of the antenna 104 and, if this is the case, in conjunction with the connection of the consumer load 128, the power consumption of the RFID reading device 102 is reduced, such that the battery life of the RFID reading device 102 is correspondingly prolonged.

A further advantage of this situation-dependent choice of the transmitting power level is that only so much power is coupled into the RFID transponder 108 as is actually required, that is, if for example only the processor 120 is to be operated, less energy is coupled in than if the consumer load 128 also needs to be supplied with energy. This can prevent a costly power management process and the discharge of large power losses from the document.

FIG. 2 shows a simplified diagram of an embodiment of the RFID reading device 102. The RFID reading device 102 has an oscillating circuit 136 with the antenna 104. The antenna 104 serves here as both a transmitting and receiving antenna.

The component 116 has a voltage divider, which is formed by the resistors 138 and 140. For example, resister 138 has 100 kΩ, and resistor 140 has 1 MΩ. The middle tap of the voltage divider is connected with an envelope detector 142. One output of the envelope detector 142 is connected to an analog/digital transformer 144. One output of the analog/digital transformer is connected to an input of the controller 112.

Through the voltage divider, the voltage is tapped at the antenna 104. After the tapped voltage is divided by the voltage divider, the envelope detector 142 continuously calculates the amplitude of the divided voltage so that after the analog/digital conversion, the signal 118, which represents the current value of the voltage and with it the generated field strength, is entered into the controller 112 by the analog/digital transformer 144.

The controller 112 can for example be designed as a microcontroller with a memory 146 for storing control parameters and a processor 148 for executing program instructions 150, which implement an embodiment of a control method according to the invention.

Alternatively, the controller can also be constructed as a circuit, for example by means of two comparators.

The amplification values for a variable amplifier 152 are stored in the memory 146, namely for example a first amplification value for setting the first transmitting power level, a second amplification value for setting the second transmitting power level, and a third amplification value for setting the third transmitting power level. Furthermore, the first, second and third threshold values can also be stored in the memory 146.

An oscillator 154 serves to generate the carrier wave of, for example, 13.56 MHz; said oscillator emits a signal which is sent over the antenna 104 after amplification by the amplifier 152. A data signal 156 is superimposed on the signal emitted by the oscillator 154 through an AND element 158. The data signal 156 can be a request to the RFID transponder 108.

The receiver 140 of the RFID reading device 102 is also connected with the oscillating circuit 136, as here the antenna 104 serves as both a transmitting antenna and a receiving antenna.

After activation of the RFID reading device 102, the execution of program instructions 150 is started. These access the first amplification value such that the transmitter 110 is operated with the first transmitting power level. The signal delivered by the oscillator 154 is then sent with the activation field strength by the antenna 104.

Through execution of the program instructions 150, the signal 118 is then continuously compared with the first threshold value. If the first threshold value is not reached, this means that the document 134 has been introduced into the range of the antenna 104, such that there is a secondary side load. The program 150 hereupon accesses the second amplification value in order to activate the amplifier 152 accordingly, so that the transmitting power is increased to the second transmitting power level.

The signal delivered by the oscillator 154 is then sent by the antenna 104 with the first operating field strength. Thereupon data communication between the RFID reading device 102 and the RFID transponder 108 (see FIG. 1) can begin, for example, in that the data signal 156 is sent.

Through execution of program instructions 150, after increase of the transmitting power to the second transmitting power level, it is continuously checked by means of evaluation of the signal 118 whether the field strength has fallen below the second threshold value. In this case, it means that the secondary side load has been increased, in that for example the consumer load 128 has been connected. Thereupon through execution of program instructions 150, the third amplification factor is accessed in order to operate the transmitter 110 with the third transmitting power level so that the second operating field strength is set.

Now through the program instructions 150, by means of evaluation of the signal 118, it is tested whether the third threshold value is exceeded. If this is the case, it means that the document 100 has been removed from the range of the antenna 104, so that due to the loss of the secondary side load, the field strength increases. Thereupon the program instructions 150 access the first amplification factor in order to set the first transmitting power level again. This process repeats when the document 134, or another document that in principle is identically configured, is brought into the range of the antenna 104.

FIG. 3 shows an alternative embodiment that differs from the one shown in FIG. 2 in that the antenna 104 serves only as a transmitting antenna, and an additional antenna 105 is present, which serves only as a receiving antenna. The voltage divider in this embodiment is connected with the antenna 105 in order to measure the field strength at antenna 105.

FIG. 4 shows a corresponding flow chart. In step 200, the RFID reading device is operated first with a minimal field strength, that is, for example, with the first transmitting power level, which results in the activation field strength. When the document with the integrated RFID transponder is introduced into the range of the RFID reading device, this is detected by the RFID reading device due to the resulting decrease of the field strength below the first threshold value, in that the measured field strength is compared to the first threshold value (step 202). After detection of decreased field strength, step 204 is started. In step 204, the transmitting power is raised to the second transmitting power level so that, for example, the second operating field strength is set. In the opposite case, the RFID reading device continues to be operated with the first transmitting power level.

In step 206 it is tested whether the measured field strength has fallen below the second threshold value. If this is not the case, the RFID reading device continues to be operated with the second transmitting power level. Otherwise in step 208, the transmitting power level is raised to the third transmitting power level.

In step 210 it is checked whether the field strength exceeds the third threshold value. If this is not the case, the RFID reading device continues to be operated with the third transmitting power level. Otherwise the sequence control system goes back to step 200 so that the RFID reading device is then operated again with the first transmitting power level, because the removal of the document has been detected.

This method can be implemented for example by the controller 112 in the embodiments illustrated in FIGS. 2 and 3.

FIG. 5 shows an alternative embodiment of a method according to the invention, whereby steps 200 through 204 of this method can be identical to those of the embodiment in FIG. 4. In step 306 following step 204, a request is sent to the document, or multiple requests such as Request A and Request B are sent, if the type of document is not known.

This request can be sent as data signal 256 according to the embodiments of FIGS. 2 and 3. In step 308 the RFID reading device tests whether the receiver 114 has received a correct response to the request from the RFID transponder of the document. If this is the case, data communication with the RFID transponder can take place in step 310, for example in that the RFID reading device repeatedly directs requests to the RFID transponder, which the latter answers.

In case the test in step 308 results in no response or no correct response, the sequence control system goes to step 312 in which the field strength is increased, for example by a single preset increment. The increment of the field strength can be, e.g. 0.5 A/m. To increase the field strength by the field strength increment, the amplification factor for the amplifier 152 (see the embodiments of FIGS. 2 and 3) is increased by one corresponding increment in order to increase the transmitting power appropriately. This increment of the amplification factor, which corresponds to the transmitting power increment, can be stored in the memory 146 of the controller 112.

In step 314, the RFID reading device sends the request again, and in step 316 there is another test as to whether a correct response has been received. If this is again not the case, the sequence control system goes back to step 312 in order to increase the field strength once more. If on the other hand the test in step 316 results in a correct response being received, then the system skips to step 310, because an operating field strength sufficient for data communication with the RFID transponder has been set.

During data communication, it is continuously tested in step 318 whether upon a request by the RFID reading device no response, or an incorrect response, is received from the RFID transponder. If this is the case, then in step 320 the field strength is readjusted, for example in that the field strength is increased by one increment, such as 0.5 A/m. After the field strength has been increased, the sequence control system goes back to step 310 in order to continue data communication. If the increase in field strength in step 320 was not sufficient, this is detected anew in step 318 in that no response, or an incorrect response, is received by the RFID transponder, so that in step 320 the field strength is incrementally increased until a sufficient operating field strength for the currently required power consumption of the RFID transponder has been reached.

If the test in step 318 results in correct responses being received, then the attempt is made from time to time to reduce the field strength. For example, a tentative reduction of field strength by one or more field strength increments takes place within preset time intervals or after a preset number of requests that the RFID reading device has sent. In step 322 it is then tested whether correct data communication is still possible despite the reduced field strength, in that a request is sent from the RFID reading device. If a correct response is received upon this request, the field strength can in fact be reduced, for example by one more field strength increment (step 324).

On the other hand, if the reduction of the field strength leads to no response or no correct response being received by the RFID transponder, the tentative reduction of field strength can be reversed, and the sequence control system goes directly from step 322 back to step 310.

FIG. 6 shows another embodiment of a document 134. In this embodiment, an overvoltage protector 158 is positioned between the antenna 106 and the processor 120 or consumer load 128. The overvoltage protector 158 is a circuit that is intended to limit to a maximum the voltage at the processor 120 or consumer load 128, in order to prevent destruction of the processor 120 or consumer load 128 through too high a voltage. To this end the circuit can contain a Zener diode 160, whereby an avalanche voltage of the Zener diode is reached when a maximum voltage for the processor or the consumer load 128 is reached. The secondary side load, which is formed by the document 134, increases significantly when the avalanche voltage of the Zener diode is reached.

FIG. 7 shows a further embodiment of a method according to the invention, which is especially suitable for a document of the type of the embodiment according to FIG. 6.

Steps 200 and 202 can be constructed identically to those of the embodiments according to FIGS. 4 and 5. In step 404 following step 202, the transmitting power is increased by a preset transmitting power increment in order to increase the field strength.

In step 405 the increment in field strength resulting from the increase in transmitting power by the transmitting power increment is measured, and in step 408, compared with a predetermined increment threshold value. As long as the field strength increment does not fall below the increment threshold value, the field strength is increased stepwise by additional field strength increments, in that the sequence control system skips from step 408 to step 404.

On the other hand, if the field strength increment lies below the increment threshold value, this indicates a strong increase in the secondary side load, which is caused by the activation of the overvoltage protector (see the overvoltage protector 158 of the embodiment of FIG. 6). In this case, the sequence control system goes from step 408 to step 410, where the field strength is reduced by one or more field strength increments, in order thereby to adjust the operating field strength.

The operating field strength thereby determined serves thereafter as the target quantity for control of the transmitting power: in step 412 the field strength is continuously measured and compared with the target value. If the measured field strength lies below the target value, the sequence control system goes to step 414, in order to adjust the transmitting power accordingly, that is, to increase the transmitting power by one transmitting power increment, for example. In the opposite case, the transmitting power is reduced in step 416, for example by one transmitting power increment. This feedback control ensures that even if the secondary side load oscillates, the operating field strength is always reached.

LIST OF REFERENCE NUMERALS

100 RFID system
102 RFID reading device
104 Antenna
105 Antenna
106 Antenna
108 RFID transponder
110 Transmitter
112 Controller
114 Receiver
116 Component 118 Signal
120 Processor
122 Program instructions
124 Memory
126 Data
128 Consumer load
130 Circuits
132 Circuits
134 Document
136 Oscillating circuit
138 Resistance
140 Resistance
142 Envelope detector
144 Analog/digital transformer
146 Memory
148 Processor
150 Program instructions
152 Amplifier
154 Oscillator
156 Data signal
158 Overvoltage protector

What is claimed is:

1. An RFID reading device comprising:
a transmitter for generating a field for inductive coupling with an RFID transponder,
a measuring component capable of measuring a field strength of the field, and
a control component capable of controlling the transmitting power level of the transmitter on the basis of the measured field strength,
wherein the control component is configured to:
detect when a device to be read is within range of the RFID reading device dependent upon the measured field strength;
operate the transmitter at a first transmitting power level if no device to be read is detected within range of the RFID reading device; and
operate the transmitter at a second, increased, transmitting power level if the device to be read is detected within range of the RFID reading device.

2. The RFID reading device according to claim 1, whereby the control component is constructed such that the transmitter is operated with the first transmitting power level, such that a first field strength results, whereby the first field strength is compared with a first threshold value, and that the transmitter is operated with the second transmitting power level if the first threshold value is not reached, whereby the second transmitting power level is greater than the first transmitting power level, such that the second field strength resulting from the second transmitting power level is greater than the first threshold value.

3. The RFID reading device according to claim 2, whereby the first field strength is greater than or equal to an activation field strength of the RFID transponder, and whereby the first field strength is less than an operating field strength of the RFID transponder.

4. The RFID reading device according to claim 3, whereby the second field strength is the first operating field strength.

5. The RFID reading device according to claim 3, whereby the control component is constructed such that after the first threshold value has not been reached, the transmitting power is increased stepwise by preset transmitting power increments, whereby the filed strength increment generated by the transmitting power increment is compared with an increment threshold value, whereby the increase of transmitting power in transmitting power increments continues until the field strength increment, which is produced by a transmitting power increment, is equal to or greater than the increment threshold value.

6. The RFID reading device according to claim 5, whereby the control component is constructed such that the transmitting power is reduced by at least one transmitting power increment if the increment threshold value is not reached.

7. The RFID reading device according to claim 5, whereby the control component is constructed such that the adjusted transmitting power value after stepwise increase of transmitting power is used as a target value for further feedback control of the transmitting power.

8. The RFID reading device according to 2, whereby the first transmitting power level is between 10 mW and 50 mW, whereby the first field strength is between 0.5 A/m and 1 A/m, and where the first field strength is less than the operating field strength of the RFID transponder.

9. The RFID reading device according to claim 8, whereby the second transmitting power level is 90 mW to 110 mW, in particular 100 mW, or 190 mW to 210 mW, in particular 200 mW.

10. The RFID reading device according to claim 8, whereby the second field strength lies between 1.5 A/m and 2.5 A/m, in particular 2 A/m.

11. The RFID reading device according to claim 2, whereby the control component is constructed such that the measured field strength is compared with a second threshold value, and that the transmitter is operated with a third transmitting power level if the second threshold value is not reached, whereby the third transmitting power level is greater than the second transmitting power level.

12. The RFID reading device according to claim 11, whereby the third transmitting power level is at least 600 mW, in particular 700 mW, and whereby the third field strength is at least 6 A/m, in particular 7 A/m to 12 A/m.

13. The RFID reading device according to claim 2, whereby the control component is constructed such that the measured field strength is compared with a third threshold value, and that the transmitter is operated with the first transmitting power level if the third threshold value is exceeded.

14. The RFID reading device according to claim 3, with a receiver capable of receiving a response from the RFID transponder due to a request sent by the transmitter, whereby the control component is constructed such that the transmitting power, after not reaching the first threshold value, is increased stepwise until the RFID transponder receives a correct response to one of the requests sent by the transmitter.

15. The RFID reading device according to claim 14, whereby the control component is constructed such that the transmitting power is reduced stepwise until the RFID transponder does not receive a correct response to a request sent by the transmitter, whereby in this case, the transmitting power is increased again by at least one step.

16. An RFID system with an RFID reading device according to claim 1, further comprising a document that contains the RFID transponder.

17. The RFID system according to claim 16, whereby the RFID transponder is a passive RFID transponder.

18. The RFID system according to claim 16, whereby the document features a consumer load, which can be supplied with electrical energy by the RFID transponder, whereby the power consumption of the consumer load changes over time.

19. The RFID system according to claim 18, whereby the consumer load is a display device or a sensor, in particular a sensor for acquiring a biometric characteristic.

20. A method for controlling a transmitting power of an RFID reading device, whereby the RFID reading device has a transmitter for generating a field for inductively coupling to an RFID transponder, with the following steps:

operating the RFID reading device with a first transmitting power level, such that a first field strength is set, as long as the RFID transponder is not located within the range of the transmitter, where the first field strength is less than an operating field strength of the RFID transponder and greater than an activation level of the RFID transponder, measuring the first field strength for detecting the introduction of the RFID transponder into the range of the transmitter, whereby due to the introduction of the RFID transponder into the range of the transmitter, the measured field strength falls below a first threshold value, operating the RFID reading device with a second transmitting power level if the measured field strength has not reached the first threshold value, whereby the second transmitting power level is greater than the first transmitting power level.

21. The method according to claim 20, with the following additional steps:

measuring the field strength after increasing to the second transmitting power level, comparing the measured field strength with a second threshold value, operating the RFID reading device with a third transmitting power level, if the measured field strength falls below the second threshold value.

22. The method according to claim 21, with the following additional steps:

measuring the field strength after increasing the transmitting power to the third transmitting power, comparing the measured strength with a third threshold value, operating the RFID reading device with the first transmitting power if the measured field strength exceeds the third threshold value.

23. The method according to claim 20, with the following additional steps:

transmitting repeatedly a request from the RFID reading device to the RFID transponder due to the first threshold value not being reached, increasing the transmitting power until one of the requests from the RFID reading device correctly receives a response from the RFID transponder.

24. The method according to claim 23, with the following additional steps:

reducing the transmitting power until one of the requests receives no correct response, and;

increasing the transmitting power due to receiving an incorrect response.

25. The method according to claim 20, with the following additional steps:

increasing the transmitting power in preset transmitting power increments due to the first threshold value not being reached, and;

reducing the transmitting power by at least one transmitting power increment if a field strength increment resulting from a transmitting power increment is smaller than a preset increment threshold value.

26. The method according to claim 25, whereby the measured field strength, after being reduced by at least one transmitting power increment, is used as the target value for further feedback control of the transmitting power.

27. A non-transient computer-readable medium containing program instructions that, when executed on a processor of an RFID reading device, control a transmitting power of the RFID device for generating a field for inductively coupling to an RFID transponder by controlling the RFID device to perform a method comprising:

operating the RFID reading device with a first transmitting power level, such that a first field strength is set, as long as the RFID transponder is not located within the range of the transmitter;

measuring the first field strength for detecting the introduction of the RFID transponder into the range of the transmitter, whereby due to the introduction of the RFID transponder into the range of the transmitter, the measured field strength falls below a first threshold value; and operating the RFID reading device with a second transmitting power level if the measured field strength has not reached the first threshold value, whereby the second transmitting power level is greater than the first transmitting power level.

* * * * *